Feb. 26, 1963  R. P. FULKNIER ET AL  3,079,372
PROCESS CONTROL SYSTEM
Filed Sept. 22, 1958
Fig. 1.
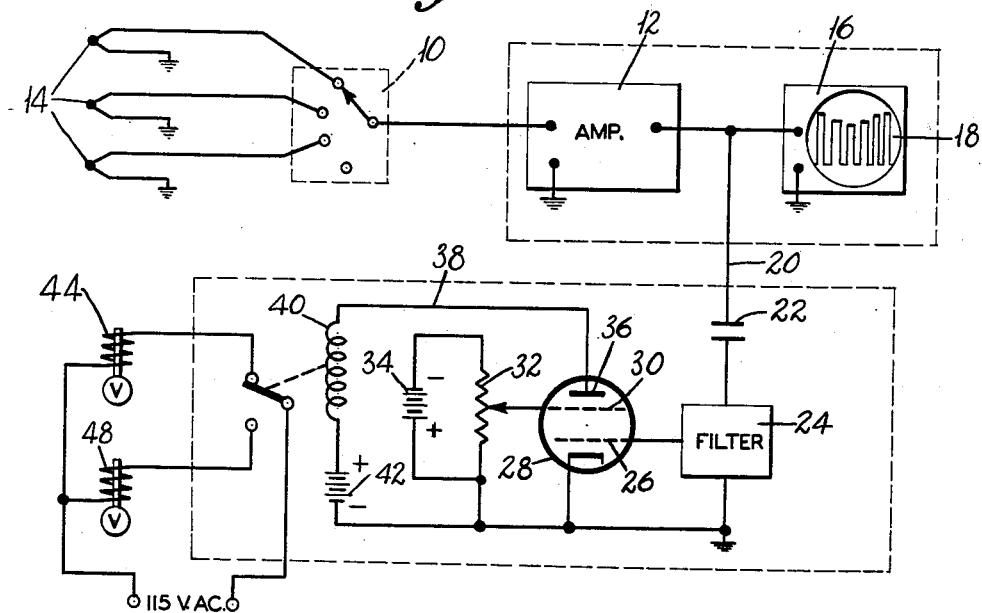
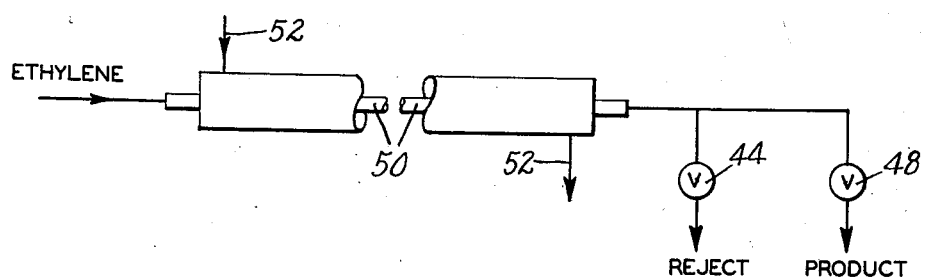
Fig. 2.
INVENTORS
RAYMOND P. FULKNIER
SAMUEL E. MITCHELL
RAYMOND B. FERTIG
BY
ATTORNEY

# 3,079,372
PROCESS CONTROL SYSTEM

Raymond P. Fulknier and Samuel E. Mitchell, Dunbar, and Raymond B. Fertig, St. Albans, W. Va., assignors to Union Carbide Corporation, a corporation of New York
Filed Sept. 22, 1958, Ser. No. 762,664
7 Claims. (Cl. 260—94.9)

This invention relates to novel multi-point control method and apparatus.

Multi-point display apparatus has wide and varied uses in modern industrial plants. Such apparatus may be used to provide a continuous display of conditions existing throughout a long and involved process. It may, for example, be used to indicate pressures or temperatures existing along a long length of reactor tubing in a chemical process or to display stresses and strains at various points upon a test model.

One of the most widely used data display means is the cathode ray oscilloscope. Data from a desired number of points is fed first through a scanning switch and from there to the amplifier of the oscilloscope. The signal is amplified and applied to the vertical deflection plates of the oscilloscope. By proper adjustment of the horizontal sweep speed, the measured quantities are shown as bars of light at various heights along the face of the screen.

An example of the use of such data display equipment would be the display of temperatures throughout the length of a long reactor tubing in chemical process plants. By the insertion of thermocouples at desired intervals along a length of tubing, signal voltages proportional to the temperatures at each point are available. It is then an easy matter to feed there voltages through a scanner switch and thence to the oscilloscope amplifier. Often, however, it is not sufficient to have visual display alone of the quantities which are being measured. With increased emphasis on the benefits to be obtained from automation, it is often desired to utilize such data display apparatus for control or alarm purposes. Manufacturers of this type of equipment normally provide apparatus capable of such adaptation by providing separate relays and amplifiers for each of the several measured points. It will be immediately obvious that such instruments rapidly assume major proportions in both size and expense. This is especially true when a large number of sample points are utilized.

The necessity of a large number of sample points is well illustrated by the high pressure, high temperature reaction process of producing ethylene polymers. By such process, resins are produced at elevated pressures and temperatures in the presence of any one of a large number of different catalysts. In U.S. Letters Patent 2,153,553 operating conditions in excess of 500 atmospheres to as high as 20,000 atmospheres and temperatures between about 100° C. and 400° C. were first disclosed as being suitable for producing solid polyethylene when oxygen is used as a catalyst. This disclosure has been followed by innumerable patents disclosing many new catalysts, for example, peroxides, dialkyl peroxides, organic hydroperoxides, amine oxides, hydrazines, hypochlorites, azines, oximes, iodosoacyl compounds, azosulfonates, Grignard reagents, lithium alkyls, polyperoxides, alkyl percarboxylates, metal azide-oxidant mixtures, hydrazones, dialkyl peroxycarbonates, and a host of other catalysts, which are well known in the art. In addition, later patents have issued showing that many compounds containing the polymerizable group $CH_2=C<$ can be copolymerized with ethylene under these conditions to produce novel and useful copolymers which have found great acceptance in industrial and home applications. Among the compounds which can be copolymerized with ethylene there may be mentioned other olefins, for example, propylene, isobutylene, and the like; acrylyl and alkacrylal compounds, for example, acrylic, haloacrylic and methacrylic acids, esters, nitriles and amides such as acrylonitrile, methacrylonitrile, methyl methacrylate, octyl methacrylate, methoxymethyl methacrylate, chloroethylmethacrylate, and the like; vinyl and vinylidene halides, for example, vinyl chloride, vinylidene chloride, and the like; vinyl esters, for example, vinyl acetate, vinyl formate, and the like; and other vinyl compounds, such as, styrene, vinyl ethyl ether, methyl vinyl ketone, vinyl pyridines, and the like. It is also known that chain transfer agents such as alcohols, carboxylic acids, aldehydes, ketones, hydrogen, hydrogen chloride, alkanes, lower alkyl halides, and the like, can be added to the ethylene feed to control the molecular weight of the polymer and to produce resin having different properties than the resin obtained when such chain transfer agents are absent. The resins so produced are generally known as telomers. Chain transfer agents can be employed in producing the homopolymer or in producing the copolymers.

By the process of this invention it is now possible to control the high temperature-high pressure process for producing polymers, copolymers, and telomers of ethylene; a problem which has plagued the industry and caused much loss ever since production was started.

This process, as indicated above, is carried out under high pressures and temperatures and is difficult to control once initiated even though it is, from a commercial standpoint, very successful. A major problem encountered, after the engineering problems concerned with the high pressures required had been solved, has been in controlling the temperature of the reaction in the extremely thick-walled tubular reactor. Operation at optimum conditions to produce maximum quantities of product requires that operating conditions be maintained close to the point of reaction instability. Slight changes in control occur accidentally from time to time, resulting in such instability and a consequent formation of undesirable black polymer. If permitted to enter the product receiver, this black polymer contaminates the entire batch making it unsuitable for use in most applications and results in economically important annual losses. The subject apparatus successfully detects conditions leading to the formation of black polymer and prevents the polymer from entering the product receiver.

The sudden appearance of black polymer formerly occurred without warning and thus it was impossible to prevent contamination of good polymer in the product receiver. Since the pressures involved in the high pressure polyethylene production process had a minimum value of approximately 500 atmospheres and ranged upward to a level of about 20,000 atmospheres, the insertion of thermocouples into the reaction tube itself was a very difficult undertaking. Consequently, all previous efforts at reaction temperature measurements had been limited to measurements of the surrounding medium or the surface of the reactor tubing. After much experimentation and investigation, thermocouples were developed capable of piercing the reactor tubes and contacting the contents while resisting the enormous pressures involved. Thereupon it was discovered that the appearance of black resin was preceded in each instance by sharp temperature increases indicative of an abrupt, markedly exothermic reaction. The temperature increase reached peaks approximating at least 1000° C. The time of such a peak was very short and the temperature unbalance at the point of measurement persisted for only a fraction of a second. For this reason there had been no inkling, prior to the present invention, that such temperatures existed. It was postulated upon this new evidence that decompositions were occurring in limited areas of the tube. This postulation was supported by analysis of the black polyethylene which was found to contain large amounts of carbon.

The above investigations failed to disclose the existence of any unusual conditions which would provide a basis for the prevention of decomposition. It did appear possible, however, to sense the temperature increase and divert the unwanted product. During none of the decomposition reactions studied was there recorded on the standard multi-point potentiometer of the reactor a temperature sufficiently elevated to indicate the source of the operating difficulty. Success of such a reject system was thus found to hinge on the development of control apparatus capable of continuously and simultaneously monitoring a large number of thermocouples with such precision and speed that a temperature increase of a fraction of a second observed by any one of the thermocouples would trigger the required response.

It is, therefore, the primary object of the present invention to provide a simplified apparatus capable of multi-point, fast response process control.

Other objects, features and advantages are to provide such apparatus having both size and expense greatly reduced over the apparatus presently available and to provide such apparatus capable of simultaneous monitoring of, and increased sensitivity to, each of the monitored values.

The above objects are attained by providing electrical instrument apparatus comprising electrical signal producing means responsive to changes in measured physical parameters; amplifier means responsive to the output of each of said electrical signal producing means; high speed scanning switch means in series with the amplifier and each of the signal producing means and comparison network means to transmit a desired portion of the amplifier output.

The invention may be more easily understood by reference to the embodiments of the attached drawings wherein FIG. 1 is a schematic diagram of the apparatus of the invention and FIG. 2 is a schematic diagram of a polyethylene reactor tube having a product diversion valve controlled by the apparatus of the invention.

In order to achieve maximum flexibility at minimum cost, novel scanning apparatus was devised whereby a large number of thermocouples could be monitored with only one amplifier and one relay means. This was achieved, as illustrated more clearly by FIG. 1 of the drawing, by use of a high speed scanning switch 10 inserted between a high gain amplifier 12 and the output leads of special high pressure thermocouples 14. The amplifier output was fed directly to the vertical deflection plates of an oscilloscope 16 so that a profile of temperatures along the axis of the reactor tube was displayed. The temperature display 18 consists of a short horizontal line on the screen of the oscilloscope corresponding to each of the thermocouple reference points. The high speed scanning switch 10 utilized in the invention is a commercial mercury jet switch which provides fast make and break contact between the amplifier input and the thermocouple leads at a rate such that each thermocouple is sampled 60 times per second.

The control feature of the invention consists in using the amplifier output as a triggering device for the desired action, as will be seen by further reference to FIG. 1. The amplifier output signal is fed by line 20 through blocking capacitor 22 and filter 24 to the control grid 26 of thyratron tube 28. The screen grid 30 of the thyratron tube is biased by variable rheostat 32 and battery 34. The screen grid bias is adjusted so that no signal passes the plate 36 of the thyratron tube while normal temperatures prevail. However, when any thermocouple indicates a momentary high temperature disturbance of a value sufficient to indicate that decomposition is taking place, the screen grid is overridden and current passes from the thyratron plate 36 through line 38 and relay coil 40 under the influence of battery 42. The relay thereupon actuates the solenoid-operated product-diversion valve 44 to reject the unwanted product and valve 48 closes.

It will be seen from the above description that the present invention combines the functions of a temperature profile indicator with a hyperthermal reject controller.

One of the outstanding features of this invention is that it becomes possible to control the product diversion valve by an instantaneous high temperature peak occurring at any one of an innumerable number of reference points by the use of only one amplifier and one relay.

In the preferred embodiment of the invention the amplifier used is a normal wide band oscilloscope amplifier. The controlling signal is thereby not merely proportional to the data display but is, in fact, the actual vertical deflection plate voltage.

As an example of the operation of the process and apparatus of the invention, 14 thermocouples were installed along the axis of a high pressure polyethylene reactor 50. The apparatus was provided with a data display screen and a standard commercial-type temperature recorder was installed on the reactor. The reactor was operated at pressures from about 20,000 to about 40,000 p.s.i.g. Temperatures between about 140° C. to 300° C. were maintained by means of a heat exchange fluid 52 circulated around the reactor tubing. The hyperthermal reject level of the control network was set at 500° C. A decomposition was then artificially induced. No significant temperature changes were recorded by the commercial instrument although the profile display showed a temperature rise in excess of 1000° C. but lasting only a few one-hundredths of a second. The short-lived increase was sufficient to open the product diversion valve and close the valve normally in operation to the product receiver.

The length of time the diversion valve is allowed to remain in the open position depends on variables such as tube length, product flow rate, internal resistance, and similar factors. The time is easily ascertainable by one skilled in the art. It is to be understood that the hyperthermal reject system of the invention encompasses any desired valve means which may be controlled by the electrical impulse from a circuit such as described above.

A further advantage of this invention is that the system continues to be operative even though any number of individual thermocouples may become inoperative. Thus the reject valve will operate even though only one thermocouple is operative to sense a temperature extreme. Further, no limit need be placed on the number of thermocouples used other than those dictated by practical considerations such as screen size for data display purposes.

It is to be understood that the invention is not necessarily limited to use with a data display device so long as means are provided to amplify the output from the scanner switch. Also, the apparatus is not limited to a polyethylene reject control system but is equally adaptable to any usage requiring an electrical output for control or alarm purposes and wherein a measured physical quantity may be expressed as an electrical voltage. It may, for example, be used for control or alarms based on temperatures, pressures, or other variables in chemical processes, steam power boilers, machinery, and many similar applications.

What is claimed is:

1. In an apparatus for the high pressure production of polyethylene polymers comprising tubular reactor means for the polymerization of ethylene, ethylene feed means, reactor heating means, and product collector means, the improvement comprising, thermocouple means at spaced intervals within said tubular reactor means in temperature sensing contact with the contents of said reactor means; product diversion valve means to divert product from said product collector means; valve actuating means responsive to said temperature sensing means for diverting product when the temperature at any point in said reactor exceeds a predetermined level; and collector means disposed to receive the output of said product diversion valve means.

2. In an apparatus for the production of polyethylene polymers comprising tubular reactor means for the polymerization of ethylene, ethylene feed means, reactor heating means, and product collector means, the improvement comprising, thermocouple means at spaced intervals within said tubular reactor means in temperature sensing contact with the contents of said reactor means; voltage amplifier means for amplifying the electrical output of each of said thermocouple means; sampling switch means in electrical series relationship with said amplifier means and each of said thermocouple means for sampling each thermocouple means to detect momentary high temperature increases; product diversion valve means responsive to the output of said amplifier means; and collector means disposed to receive the output of said product diversion valve means.

3. In an apparatus for the production of polyethylene polymers comprising tubular reactor means for the polymerization of ethylene, ethylene feed means, reactor heating means, and product collector means, the improvement comprising thermocouple means at spaced intervals within said tubular reactor means in temperature sensing contact with the contents of said reactor means; oscilloscope means for amplifying the electrical output of each of said thermocouple means and applying said amplified output to the vertical deflection plates thereof; sampling switch means in intervening electrical series relationship with said oscilloscope means and each of said thermocouple means for sampling each thermocouple means to detect momentary high temperature increases; product diversion valve means responsive to the voltage across said vertical deflection plates; and collector means disposed to receive the output of said product diversion valve means.

4. In combination, high pressure reactor means for the polymerization of ethylene to polyethylene, a plurality of high pressure thermocouple means in piercing relationship to the wall of said reactor means in spaced relationship along the longitudinal dimension thereof, in contact with the contents of said reactor means, and responsive to the local momentary high temperature increases caused by a polyethylene decomposition reaction; amplifier means responsive to the output of each of said thermocouple means; high speed scanning switch means in intervening electrical series relationship with said amplifier means and each of said thermocouple means for sampling each thermocouple means to detect momentary high temperature increases; comparison network means to transmit that portion of the amplified output in excess of a corresponding preset temperature level; and decomposition-product diversion-valve means responsive to said amplified portion whereby the product of said polyethylene decomposition reaction is diverted from the primary polyethylene receiving means.

5. In the high temperature, high pressure continuous process for the production of polyethylene polymers in a tubular reactor wherein ethylene monomer is introduced into said reactor and polyethylene polymers are discharged from said reactor to a product receiver, the improvement which comprises continuously sensing the temperature of the reaction stream at points spaced along the length of the reactor to detect momentary high temperature increases in said reaction stream above a preselected temperature level indicating the occurrence of decomposition reactions with the formation of contaminating decomposed product in said reaction stream and diverting the product stream from the tubular reactor to prevent its discharge into the product receiver upon detection of such decomposition reactions, continuing the diversion of the product stream for a period of time at least sufficient to discharge from the tubular reactor all of the decomposed product, and thereupon redirecting said product stream to the product receiver.

6. The process in accordance with claim 5 wherein the reactor is normally maintained at a temperature of 140° C. to 300° C., and the ethylene within said reactor is at a pressure of 20,000 to 40,000 p.s.i. and the product is diverted upon a momentary temperature increase above 500° C.

7. In the high temperature, high pressure continuous process for the production of polyethylene polymers in a tubular reactor wherein ethylene monomer is introduced into said reactor and polyethylene polymers are discharged from said reactor to a product receiver, the improvement which comprises continuously sensing the temperature of the reaction stream in each of a plurality of zones within said tubular reactor at points spaced along the length of the reactor to detect momentary high temperature increases in said reaction stream above a preselected temperature level indicating the occurrence of decomposition reactions with the formation of contaminating decomposed product in the reaction stream in any of said zones, developing a signal immediately upon the occurrence of such momentary high temperatures in said reacttion stream, diverting the product stream from the tubular reactor upon development of such a signal to prevent its discharge into the product receiver, continuing the diversion of the product stream for a period of time at least sufficient to discharge from the tubular reactor all of the decomposed product, and thereupon redirecting said product stream to the product receiver.

References Cited in the file of this patent

UNITED STATES PATENTS

| | | |
|---|---|---|
| 2,402,137 | Hanford et al. | June 18, 1946 |
| 2,449,304 | Lamb | Sept. 14, 1948 |
| 2,504,931 | Knudsen | Apr. 18, 1950 |
| 2,564,294 | Belcher | Aug. 14, 1951 |
| 2,573,175 | Bergen et al. | Oct. 30, 1951 |
| 2,577,973 | MacDougall et al. | Dec. 11, 1951 |
| 2,578,447 | Odell et al. | Dec. 11, 1951 |
| 2,692,257 | Zletz | Oct. 19, 1954 |
| 2,696,604 | Markow et al. | Dec. 7, 1954 |
| 2,834,008 | Carbauh | May 6, 1958 |
| 2,856,395 | Richard et al. | Oct. 14, 1958 |

FOREIGN PATENTS

| | | |
|---|---|---|
| 471,590 | Great Britain | Sept. 6, 1937 |